(12) United States Patent
De Marchi et al.

(10) Patent No.: US 10,914,711 B2
(45) Date of Patent: Feb. 9, 2021

(54) DEVICE, METHOD AND SYSTEM FOR REAL TIME STRUCTURAL DIAGNOSTICS WITH GUIDED ELASTIC WAVES

(71) Applicant: ALMA MATER STUDIORUM-UNIVERSITA DI BOLOGNA, Bologna (IT)

(72) Inventors: Luca De Marchi, Bologna (IT); Nicola Testoni, Casalecchio di Reno (IT); Alessandro Marzani, Bologna (IT)

(73) Assignee: ALMA MATER STUDIORUM-UNIVERSITA DI BOLOGNA, Bologna (IT)

( * ) Notice: Subject to any disclaimer, the term of this patent is extended or adjusted under 35 U.S.C. 154(b) by 194 days.

(21) Appl. No.: 15/567,071

(22) PCT Filed: Apr. 15, 2016

(86) PCT No.: PCT/IB2016/052168
§ 371 (c)(1),
(2) Date: Oct. 16, 2017

(87) PCT Pub. No.: WO2016/166722
PCT Pub. Date: Oct. 20, 2016

(65) Prior Publication Data
US 2018/0136170 A1    May 17, 2018

(30) Foreign Application Priority Data
Apr. 16, 2015  (IT) .......................... MI2015A000556

(51) Int. Cl.
*G01N 29/12*   (2006.01)
*G01N 29/26*   (2006.01)
(Continued)

(52) U.S. Cl.
CPC ......... *G01N 29/12* (2013.01); *G01N 29/2475* (2013.01); *G01N 29/262* (2013.01);
(Continued)

(58) Field of Classification Search
CPC .. G01N 29/12; G01N 29/4472; G01N 29/262; G01N 29/2475; G01N 29/46;
(Continued)

(56) References Cited

U.S. PATENT DOCUMENTS

2002/0190723 A1   12/2002  Sun
2005/0007882 A1*   1/2005  Bachelor ................. G01S 15/89
                                                              367/103
(Continued)

FOREIGN PATENT DOCUMENTS

EP         0559656 A1    9/1993
EP         2078943 A2    7/2009
(Continued)

OTHER PUBLICATIONS

Notification of Transmittal of the International Search Report and the Written Opinion of the International Searching Authority for PCT/IB2016/052168 dated Jul. 18, 2016.
(Continued)

*Primary Examiner* — Randy W Gibson
*Assistant Examiner* — Gedeon M Kidanu
(74) *Attorney, Agent, or Firm* — Hedman & Costigan, P.C.; James V. Costigan; Kathleen A. Costigan

(57) ABSTRACT

The present invention relates to a method for making a device for monitoring the structural integrity of structures such as beams, plates and shells, made of isotropic, anisotropic and/or laminated material, and to such a device. The method provides to define a asymmetric directivity function $D(k1,k2)$ that has, in the domain of wave numbers, a plurality of maxima arranged on different concentric cir-
(Continued)

cumferences having center in the origin of the axes. Then a load distribution in spatial coordinates f(x1,x2) is computed by inverse Fourier transform of the directivity function D(k1,k2). Then therefore the device is made with the electrodes, whose shape is obtained by gathering the values of the load distribution f(x1,x2) in the plane having for coordinates the set of real numbers and imaginary numbers, defining at least two sectors of said plane that comprise at least one real value and one imaginary value.

12 Claims, 10 Drawing Sheets

(51) Int. Cl.
*G01N 29/46* (2006.01)
*G10K 11/34* (2006.01)
*G01N 29/24* (2006.01)
*G01S 15/89* (2006.01)
*G01N 29/44* (2006.01)

(52) U.S. Cl.
CPC ......... *G01N 29/4472* (2013.01); *G01N 29/46* (2013.01); *G01S 15/8915* (2013.01); *G01S 15/8952* (2013.01); *G10K 11/343* (2013.01); *G01N 2291/0258* (2013.01); *G01N 2291/0425* (2013.01); *G01N 2291/106* (2013.01)

(58) Field of Classification Search
CPC ..... G01N 2291/106; G01N 2291/0425; G01N 2291/0258; G01S 15/8915; G01S 15/8952; G10K 11/343
See application file for complete search history.

(56) References Cited

U.S. PATENT DOCUMENTS

| | | | |
|---|---|---|---|
| 2009/0048789 A1* | 2/2009 | Yu | G01N 29/348 |
| | | | 702/39 |
| 2010/0319455 A1* | 12/2010 | Ihn | G01N 29/069 |
| | | | 73/603 |
| 2013/0343424 A1* | 12/2013 | Zombo | G01N 29/0672 |
| | | | 374/117 |
| 2014/0157898 A1* | 6/2014 | Ruzzene | G01N 29/245 |
| | | | 73/579 |

FOREIGN PATENT DOCUMENTS

| | | |
|---|---|---|
| WO | 92/09592 A1 | 6/1992 |
| WO | 2008/144356 A1 | 11/2008 |
| WO | 2009/148660 A2 | 12/2009 |
| WO | 2010/071786 A1 | 6/2010 |

OTHER PUBLICATIONS

Matteo Senesi and Massimo Ruzzene, A frequency Selective Acoustic Transducer for Directional Lamb Wave Sensing, The Journal of the Acoustical Society of America, Oct. 2011, pp. 1899-1907, vol. 130, No. 4.

* cited by examiner

DEVICE, METHOD AND SYSTEM FOR REAL TIME STRUCTURAL DIAGNOSTICS WITH GUIDED ELASTIC WAVES

TECHNICAL FIELD

The present invention relates to the field of piezoelectric sensors/actuators and of methods for monitoring the structural integrity of structures, specifically mainly surface developing structures (plates or boards, smooth or ribbed), either isotropic structures or structures made of composite materials.

The invention particularly relates to a method for providing a device for monitoring structures according to the preamble of claim 1, and a device produced according to such method.

The invention relates also to a system and a method using such device for monitoring the integrity of said structures by guided elastic waves.

Preferably, but not exclusively, the present invention is applied in the field of laminated structures made of metal and composite materials employed for aerospace, aircraft, railway and motor vehicle platforms as well as in all fields where the monitoring of the structural integrity has an important role in order to guarantee safety of users of the above structures.

Prior Art

Among the methods for monitoring the structural integrity (SHM, Structural Health Monitoring) of laminated structures made of metal or composite material, those based on guided elastic waves (GW) are currently considered as the most promising.

Monitoring is carried out by a set (array) of small and lightweight piezoelectric transducers, bonded on the surface of the structure or embedded therein, controlled by a suitable data acquisition system (DAQ); guided elastic waves can be generated by the transducers (actuators), adverse events, such as impacts, such as also by damages present in the structure if suitably stressed. The guided waves acquired by the transducers (sensors) in the form of time responses are then processed by signal processing tools to monitor adverse events, such as impacts on the structure, and to locate the position thereof.

Examples of the above monitoring methods are described for instance in patent documents EP 559656, US20020190723, US20090048789, WO2009148660, EP2078943, US20130343424 and WO2010071786.

SHM methods based on guided elastic waves allow wide areas to be monitored from few accessible points of the structure, that is from the positions of the transducers, and to examine hidden parts of the structure, provided that such hidden parts can be reached by the propagation of guided elastic waves.

However, currently, the potential of monitoring systems based on guided elastic waves, specifically for detecting impacts in structures of composite material, is limited by some physical aspects and by technological limits; composite materials attenuate the mechanical energy of guided elastic waves more quickly than metal materials, thus reducing the propagation distance of the waves, and therefore the monitoring area for a given position of the transducers.

Accordingly, the current guided elastic wave monitoring systems require dense transducer arrays, having a high number of sensors/actuators per unit of area; sophisticated signal processing techniques that require quite powerful computational platforms; highly complex wiring among sensors/actuators and the processing unit.

Moreover the propagation of the guided waves in the composite materials, unlike for metal materials, is anisotropic, that is the characteristics of the guided waves depend on their direction of propagation. Therefore a proper monitoring system for composite materials requires to use signal processing tools particularly heavy as regards computation in order to treat such anisotropy.

Briefly, the systems currently used for monitoring composite structures exhibit a considerable complexity, overall dimensions, weight and power consumption, as well as high maintenance costs.

In order to try to overcome the above drawbacks, solutions have been studied that provide the structural monitoring unit to perform an algorithm intended to generate three-dimensional images of the defect by using the reflection (scattering) of the guided waves generated by the defect by comparing the signals acquired when the structure is pristine conditions ("baseline") and those acquired when the structure might have been subjected to damages; examples of such solutions are for instance described in patent applications US20100319455 and WO2008144356; however such solutions have the drawbacks of: a) being anyway based on dense sensor arrays, b) leading to wrong estimations (false alarms) when structures are subjected to operating conditions (temperature, humidity, load, vibrations) different than those present when the baseline signals have been acquired.

An improvement of the above methods and systems is the FSAT technology (Frequency-Steerable Acoustic Transducer), that allows waves propagating in two-dimensional domains to be generated or directionally detected by a time-frequency analysis of the received signal and that is the subject matter of the patent application US20140157898 and of the scientific document: "Fabrication and Characterization of a Wavenumber-Spiral Frequency-Steerable Acoustic Transducer for Source Localization in Plate Structures" IEEE Transactions on Instrumentation and Measurement, 2197-2204.

Such documents show how a device of the FSAT type, by the particular geometry, acts as a spatial filter for guided elastic waves propagating therethrough, by selecting different wavelengths (and therefore different frequencies for the given structure) as a function of the direction of propagation of the waves.

More precisely, spiral-shaped FSAT transducers described in the above documents provide a one-to-one correspondence between the maximum of the frequency response of the spectrum of the received or transmitted signal and the direction of propagation of the waves within the range from 0° to 180°.

The limit of such solution is the fact that said transducers are characterized by a directivity that leads to determine the direction of propagation of the wave but not its orientation.

If one desires to determine the position of a defect on the basis of the reflections of acoustic waves generated by using the teaching of the patent documents mentioned above it is necessary to use at least two sensors/actuators.

Finally the above solution has also the drawback of considerable side lobes in the frequency response that make the association between the direction of propagation and frequency contents of the transmitted or received signal more uncertain.

Therefore currently there is the unsatisfied need of using only one sensor/actuator able to receive or transmit a guided elastic wave whose direction and orientation are known.

Moreover also the need of reducing the side lobes is currently unsatisfied.

OBJECTS AND SUMMARY OF THE INVENTION

It is the object of the present invention to overcome the limits of prior art structural monitoring systems and methods (SHM), specifically of those using FSAT technology. It is also an object of the present invention to provide a method for providing improved FSAT devices.

In particular it is the object of the present invention to provide a device, particularly a piezoelectric sensor/actuator, whose use for monitoring the integrity of a structure allows prior art drawbacks to be overcome.

Still more particularly, it is the object of the present invention to provide a device having a configuration able to receive or transmit a guided elastic wave whose direction and orientation are known.

Another object of the present invention is to provide a system and a relevant method for the real-time structural diagnostic by guided elastic waves that overcome prior art drawbacks.

Another object of the present invention is to make it possible to develop intelligent structures able to autonomously carrying out tests about the structural integrity by using integrated monitoring systems.

These and other objects of the present invention are achieved by a device, a sensor node, a system and a method embodying the characteristics of the annexed claims.

The idea at the base of the present invention provides to make a device for monitoring the structural integrity of a structure, comprising a plurality of electrodes made of piezoelectric material, which have such a geometrical shape that the excitation of the electrodes by a guided wave propagating within the structure generates at the electrodes at least one voltage signal with a frequency depending on the direction and orientation of origin of the guided wave. Vice versa, the excitation of the electrodes by one or more electrical signals with a suitable frequency, allows guided waves with known direction and orientation to be transmitted.

Such a device allows the number of sensors necessary for monitoring a structure to be reduced, this because a single device is able to calculate the direction and the orientation of the guided wave that has excited it; unlike the prior art, therefore, it is not necessary to triangulate information measured by two or more sensors for obtaining the same information.

Advantageously such a device is produced according to a method providing to define analytically an asymmetric directivity function $D(k1,k2)$ that presents, in the domain of wave numbers, a plurality of maxima arranged on different concentric circumferences having center in the origin of the axes ($k1=k2=0$). Then a load distribution in spatial coordinates $f(x1,x2)$ is computed by the inverse Fourier transform of the directivity function $D(k1,k2)$. Finally the device is obtained with electrodes whose shape is obtained by gathering the values of the load distribution $f(x1,x2)$ in the plane having for coordinates the set of real numbers and imaginary numbers, thus defining at least two sectors of said plane that comprise at least one real value and one imaginary value and providing a number of electrodes equal to the number of defined sectors, wherein each electrode has a shape corresponding to the points of the load distribution $f(x1,x2)$ that lie in the same sector.

Electronic components are also described, such as a sensor node and a system, that comprise the device made by such method and a method for monitoring the structural integrity of a laminated structure, made of a metal or composite material, employing the device.

The present invention relates also to a system and a method for the real-time structural diagnostic by guided elastic waves using at least a device or a sensor node of the above type and described better in the following description.

Advantageously the present invention has the following features:
- possibility of being applied to structures made of different materials (composite and non-composite materials);
- low power consumption, obtained by the innovative mode for shaping the sensor/actuator, designed as the primary tool for generating and receiving waves propagating along programmed directions and having known orientation;
- reduced overall dimensions and lightweight, obtained by optimizing the interface of the sensor/actuator; and
- reduced wiring complexity, obtained by using power-line communication systems for the combined transmission of data and power on the same means.

The adoption of the solution according to the present invention allows to carry out also a continuous, not intrusive, active and passive monitoring in real-time for structures made of metal or composite material, with a negligible power consumption and a very small effect on mechanical parameters (such as for instance weight and stiffness) of the monitored structures.

The solution according to the present invention is preferably applied in the aeronautical field for example for the early diagnosis of impact delamination in composite structures.

BRIEF DESCRIPTION OF THE DRAWINGS

The invention will be described herein below with reference to not limitative examples, given by way of explanatory and not limiting example in the annexed drawings.

These drawings show different aspects and embodiments of the invention and, where appropriate similar structures, components, materials and/or elements in different figures are denoted by similar reference numerals.

DETAILED DESCRIPTION OF THE INVENTION

Figure 1:
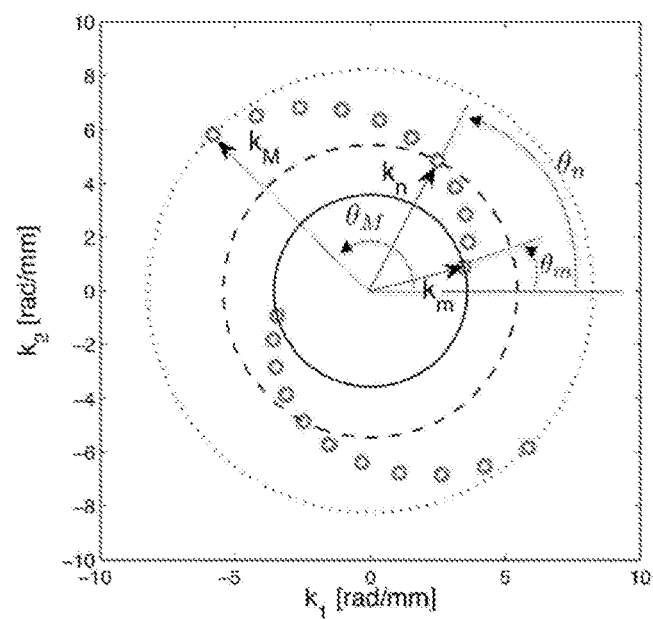
FIG. 1 shows the symmetric spiral shaped distribution of wave numbers (kn) according to prior art.

While the invention is susceptible of various modifications and alternative constructions, some preferred embodiments are shown in the drawings and will be described in details herein below. It should be understood, however, that there is no intention to limit the invention to the specific disclosed embodiments but, on the contrary, the invention intends to cover all the modifications, alternative constructions and equivalents that fall within the scope of protection of the invention as defined in the annexed claims.

The use of "for example", "etc.", "or" denotes non-exclusive alternatives without limitation, unless otherwise indicated. The use of "includes" means "includes, but not limited to", unless otherwise indicated.

Figure 2:
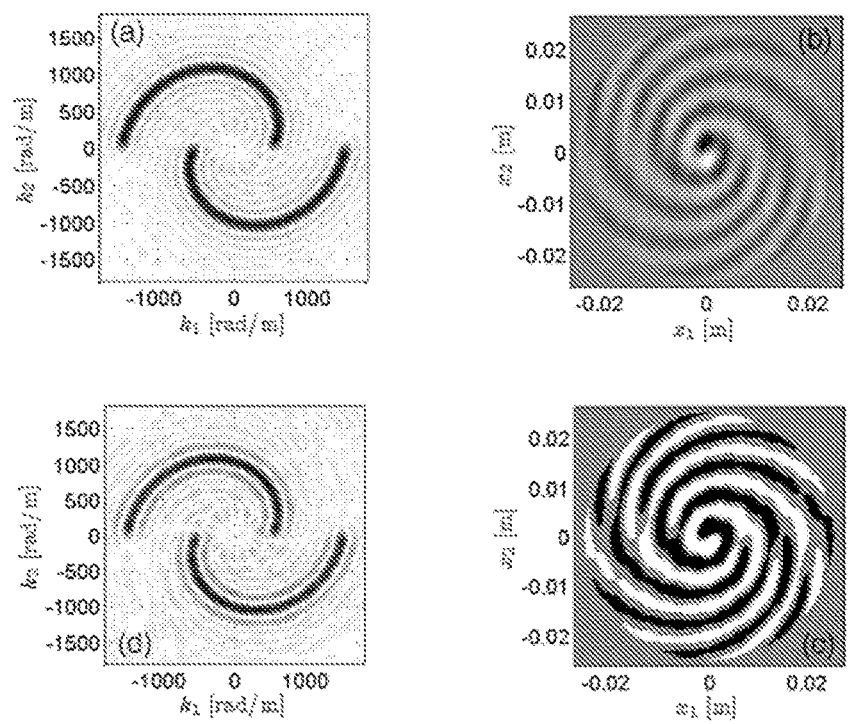
FIG. 2 shows in (a) the distribution of the symmetric spiral in the domain of wave numbers (k1,k2) according to prior art, in (b) the corresponding geometry of the device in the spatial domain (x1,x2) according to prior art, in (c) the geometry after thresholding procedure according to prior art and in (d) the corresponding distribution of wave numbers according to prior art respectively.

With reference to FIGS. 1 and 2, showing the solution according to prior art described in the above documents US20140157898 and "Fabrication and Characterization of a Wavenumber-Spiral Frequency-Steerable Acoustic Transducer for Source Localization in Plate Structures" they point out that FSAT device acts as a spatial filter on guided elastic waves, by selecting different wavelengths—and therefore different frequencies—depending on the direction of propagation of the guided elastic waves. This is obtained by a particular configuration of the sensor starting from the concept of frequency-steerable directivity.

The concept of frequency-steerable directivity derives from the general expression of the voltage measured at the electrodes of a piezoelectric transducer excited by a plane wave with an angular frequency ω coming from direction θ:

$$V_m(\omega,\theta) = \jmath\, U_m(\omega,\theta) H(\theta) k_m(\omega,\theta) D(k_{1,m}(\omega,\theta), (k_{2,m}(\omega,\theta)))$$

where
$V_m(\omega, \theta)$ is the voltage generated by the propagation of mode m,
$U_m(\omega, \theta)$ is the amplitude and the polarization of the wave for mode m,
$H(\theta)$ contains the properties of transducer-structure combined system,
$k_m(\omega, \theta)$ is the wave vector defining the mode of propagation for mode m, whose components along the coordinate axes $i_1$ e $i_2$ are $k_{1,m}(\omega, \theta)$ e $k_{2,m}(\omega, \theta)$, respectively and $D(k_{1,m}(\omega, \theta), k_{2,m}(\omega, \theta))$ is the directivity function calculated in $k_{1,m}(\omega, \theta)$ e $k_{2,m}(\omega, \theta)$.

The directivity function D(k1,k2) can be calculated as:

$$D(k_1, k_2) = \int_\Omega e^{j(k_1 x_1 + k_2 x_2)} f(x_1, x_2) dx_1 dx_2$$

that is like the two-dimensional Fourier Transform in k1, k2 of the load distribution in spatial coordinates f(x1, x2). It describes the effect of the load distribution on the strength of the signal received as a function of the components of the incident wave vector.

Vice versa, by employing the two-dimensional inverse Fourier Transform, it is possible to define the spatial load distribution f(x1, x2) that provides a given directivity D(k1, k2) as:

$$f(x_1, x_2) = \int e^{-j(k_1 x_1 + k_2 x_2)} D(k_1, k_2) dk_1 dk_2$$

By assigning to D(k1,k2) the function $$D(k_1, k_2) = -j\frac{1}{N}\sum_{n=1}^{N}[\mathrm{sinc}(a\,|k - \gamma_n|) - \mathrm{sinc}(a|k + \gamma_n|)]$$

where k=(k1,k2) and $\gamma_n = (\gamma_{1,n}, \gamma_{2,n})$ are both wave vectors with $$\gamma_{1,n} = \left[(k_{max} - k_{min})\frac{\theta_n - \theta_{min}}{\theta_{max} - \theta_{min}} + k_{min}\right]\cos(\theta_n)$$

$$\gamma_{2,n} = \left[(k_{max} - k_{min})\frac{\theta_n - \theta_{min}}{\theta_{max} - \theta_{min}} + k_{min}\right]\sin(\theta_n)$$

we obtain the possibility of matching the angle $\theta_n$ with a particular wave vector $\gamma_n$ for which the directivity function D takes a maximum.

The vector $\gamma_n$ in turn can be associated to a particular frequency ωn on the basis of the relation $k_m(\omega, \theta)$ and therefore, in the operation in detection mode, such design arrangement causes the spectrum of the output signal of the FSAT device to have peaks at different frequencies as a function of the incoming direction of the wave.

Due to the reciprocity of the mechanisms receiving and generating acoustic waves, by such design arrangement it is possible to select different directivity peaks by changing the excitation frequency, thus guiding the steering of the emitted waves on the basis of the frequency of the signal in voltage on the transducer.

It is possible to obtain the steering in any direction within an angle range from 0° to 180° through a scanning of the excitation frequency by the following design arrangement, providing:

1. designing the directivity in the wave number domain,
2. defining the spatial load distribution and
3. thresholding procedure for obtaining the geometry of the electrodes of the FSAT sensor.

The design step starts by defining the desired directivity performance in the plane of the wave numbers that, as shown in FIG. 1, provides the maximum values of the directivity function in such domain to be arranged along spiral arcs: the spiral shape causes a specific wave number (e.g. kn) to intersect only one maximum value of directivity, and then, to identify only one direction. Each angle (e.g. $\theta_n$) of origin/transmission of a guided wave is therefore related to a specific wave number (e.g. $k_n$).

The geometry of the device that provides the desired directional properties is determined by performing the inverse Fourier Transformation of the directivity function, such as shown in graphical representations (a) and (b) of FIG. 2; particularly the graphical representation (1) of FIG. 2 is the distribution with two symmetric spiral arcs in the domain of the wave numbers, while the graphical representation (b) of FIG. 2 is the corresponding geometry of the FSAT device determined by the inverse Fourier Transform of the preceding distribution, that, by its symmetry, provides merely real values of the load distribution f(x1,x2).

However the load distribution previously determined cannot be in practice performed with traditional piezoelectric transducers due to the continuous amplitude modulation; therefore the load distribution practically performable is obtained by thresholding procedure. The thresholding procedure associates to the distribution values higher than a given threshold, e.g. ε, a value equal to 1 (black in FIG. 2 (c)), to those lower than a second threshold, e.g. −ε a value equal to −1 (white in FIG. 2 (c)) and to intermediate values, e.g. −ε<f(x1,x2)<ε a value equal to 0 (grey in FIG. 2 (c)). Therefore the device is made with two electrodes whose shapes correspond to the white and black areas of FIG. 2 (c), that is those with not null values.

The thresholding procedure does not damage too much the frequency response of the device, as it can be seen by the corresponding distribution in the wave number domain shown in FIG. 2 (d).

As it can be seen, in prior art arrangement, by imposing the directivity D(k1, k2) to be symmetric (such to obtain a corresponding spatial load distribution with merely real values) a single steering direction of the signal is obtained, but not its orientation.

The inventors of the present invention have thought to provide a device, particularly a sensor/actuator, whose directivity function is asymmetric on all 360° to be monitored, such to have a different frequency response of the device to different directions and orientations of propagation of the guided waves.

Figure 3:
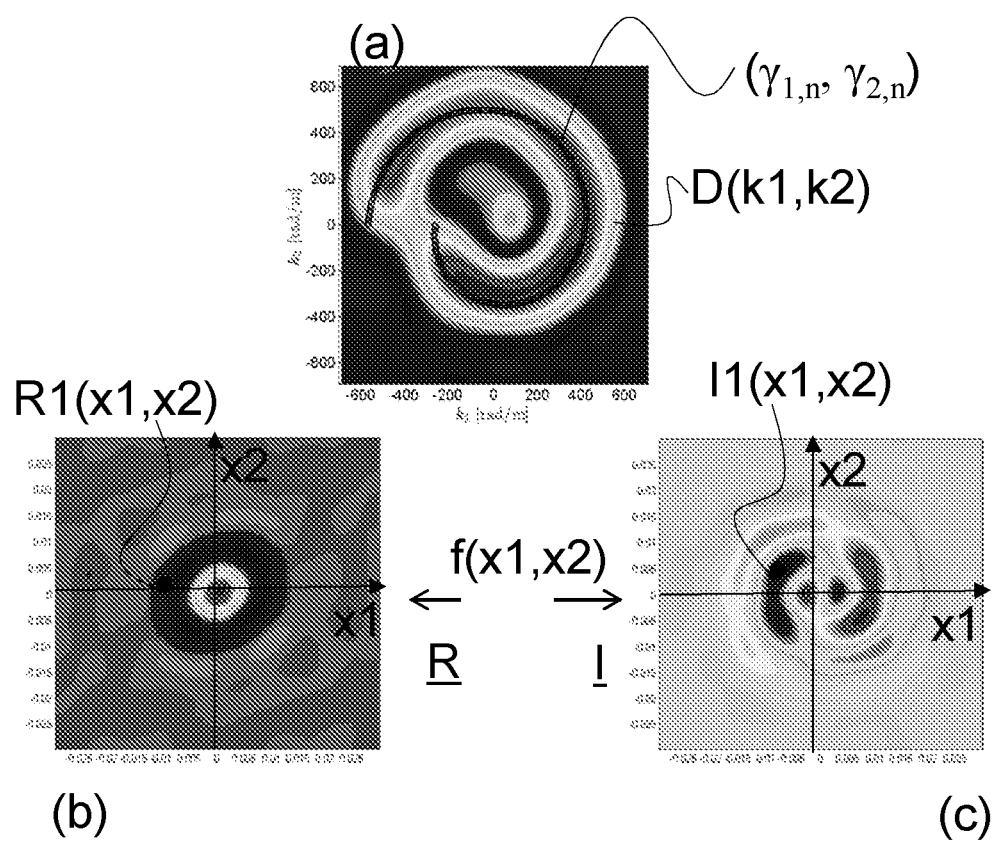
FIG. 3 shows in (a) the distribution of the asymmetric spiral in the domain of wave numbers according to the present invention, in (b) the corresponding distribution of the real component of the load in the spatial domain of the sensor/actuator according to the present invention and in (c) the corresponding distribution of the imaginary component in the spatial domain of the sensor/actuator according to the present invention respectively.
Figure 4:
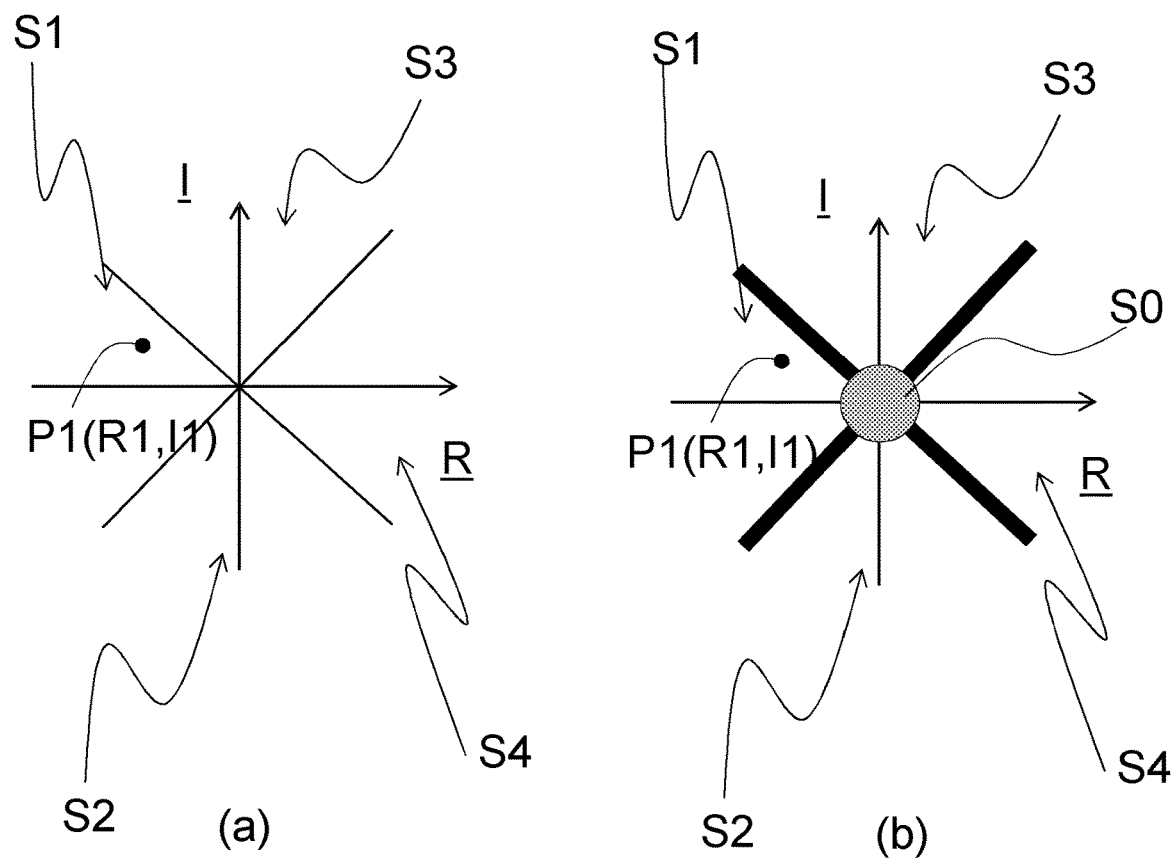
FIG. 4 shows in (a) and in (b) two possible divisions of the complex plane used for obtaining the geometry of the electrodes of the sensor/actuator according to the present invention in the combined domain of real space and imaginary space.
Figure 5:
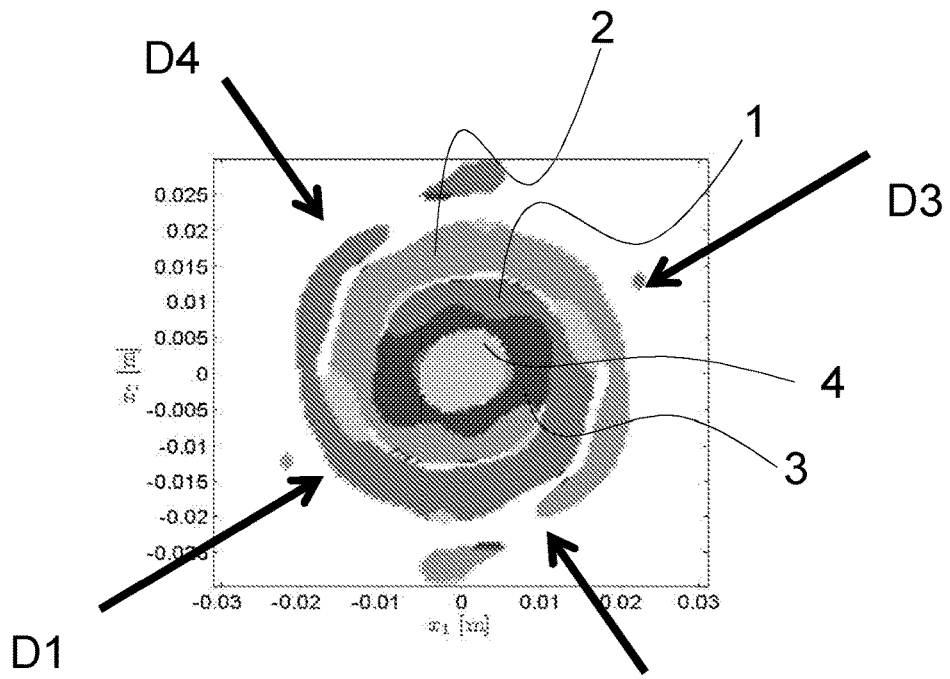
FIG. 5 shows the geometry of the sensor/actuator of FIG. 4a after the complex thresholding procedure according to the present invention.

With reference to FIGS. 3, 4 and 5 showing the solution according to the present invention, it is noted that the shape of the device electrodes (FIG. 5) is designed such to obtain the possibility of steering—according to a predetermined direction and orientation—an elastic wave generated as a function of the frequency contents of the electric signals used in operating mode; similarly when the device is used in reception mode, it is sensitive only to specific frequency bands, bands that are specific functions of the direction and orientation of origin of incident waves.

Figure 12:
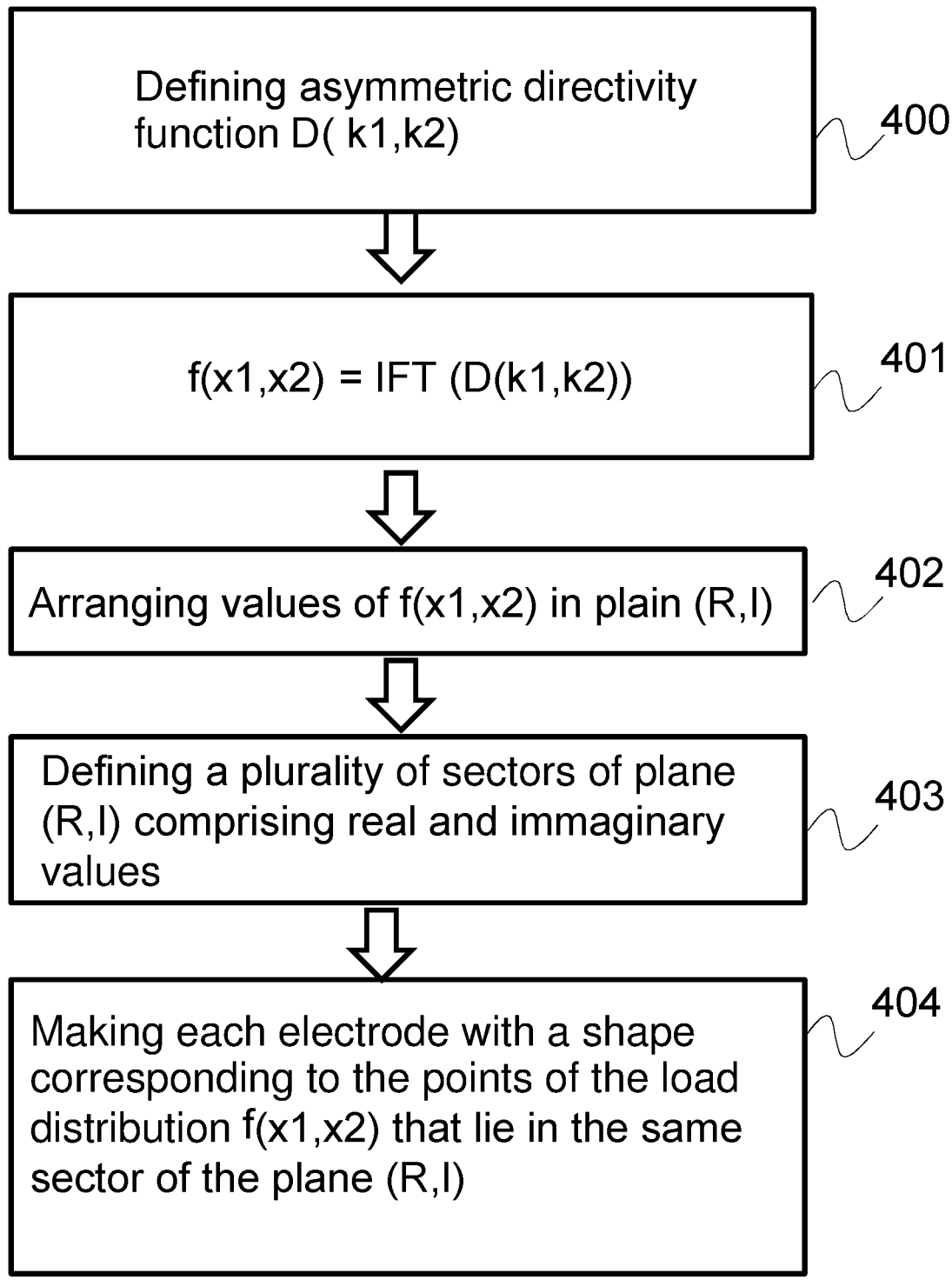
FIG. 12 shows a flow diagram of a method for making the device of FIG. 5.

Thus by operating a frequency filtering, it is possible to isolate the waves coming from a specific direction and having a specific orientation with respect to all the other ones. A method for making a device with the characteristics defined above is described below with reference to FIG. 12.

Specifically, the design of the sensor/actuator according to the present invention starts (step 400) by defining a directivity function D(k1,k2) whose maxima are, within the domain of wave numbers, on different circles having the center at the origin of the axes $k_1$, $k_2$. Such distribution therefore will not be symmetric.

For example the directivity function D(k1,k2) can be configured like a spiral arc of 360°, in the domain of wave numbers, such as shown in FIG. 3 (a) where D(k1,k2) is shown as superimposed on points defined by the parameters $\gamma_{1,n}$ and $\gamma_{2,n}$, described below. The directivity function D(k1, k2) of FIG. 3 (a) is represented by the following equation:

$$D(k_1, k_2) = \frac{1}{N}\sum_{n=1}^{N} Ker(k_1 - \gamma_{1,n}, k_2 - \gamma_{2,n}) \quad (1)$$

where
N is the number of kernel used for synthetizing the directivity function,
$Ker(k_{1-\gamma_{1,n}}, k_{2-\gamma_{2,n}})$ is a suitable kernel function Ker(a1,a2) calculated in $k_1-\gamma_{1,n}$ and $k_2-\gamma_{2,n}$ for instance defined as an isotropic Gaussian distribution:

$$Ker(a_1, a_2) = 2\pi\left(\frac{b}{2}\right)^2 \exp\left(-\left(\frac{b}{2}\right)^2 (a_1^2 + a_2^2)\right) \quad (2)$$

where the parameter b is the function decay rate.

As regards the parameters $\gamma_{1,n}$ and $\gamma_{2,n}$, they have been chosen on the basis of the wave vector $k_m(\omega, \theta)$ corresponding to mode m as:

$$\begin{cases} \gamma_{1,n} = k_{1,m}(\omega_n, \theta_n) \\ \gamma_{2,n} = k_{2,m}(\omega_n, \theta_n) \end{cases} \quad (3)$$

where $\omega_n$ and $\theta_n$ are selected for instance as:

$$\begin{cases} \theta_n = \frac{2\pi}{N}n \\ \omega_n = \frac{\omega_{max} - \omega_{min}}{N}n + \omega_{min} \end{cases} \quad (4)$$

Once the directivity function is defined in the domain of wave numbers, the inverse Fourier Transformation operation is carried out on said directivity function (step 401). Thus obtaining a load distribution f(x1,x2) that, in the domain of spatial coordinates $x_1$, $x_2$, has complex values. For example the inverse Fourier transform of the equation (1) according to definitions (2)-(3) defines the following load distribution f(x1,x2):

$$f(x_1, x_2) = \exp\left(-\left(\frac{x}{b}\right)^2\right)\sum_{n=1}^{N} \exp(jk_{1,0}(\omega_n, \theta_n)x_1 + jk_{2,0}(\omega_n, \theta_n(x_2)) \quad (5)$$

where x is the magnitude of the vector given by spatial coordinates (x1,x2).

Images of FIG. 3 (b) and FIG. 3 (c) show, in the plane (x1,x2), real values R and imaginary values I of the inverse Fourier transform of the distribution of FIG. 3(a).

In order to determine the spatial distribution of the electrodes of the device, a complex thresholding procedure is performed.

The values of the load distribution f(x1,x2) are drawn in the plane (R,I) of real and imaginary numbers (step 402), which is in turn divided into any number, higher than two, of sectors each one comprising at least a real value and an imaginary value (step 403).

In the example of FIG. 4 (a) the plane (R, I) is divided into four sectors S1, S2, S3, and S4 by two bisectors I=R and I=–R. Therefore each sector is associated with an electrode (step 404), therefore all the points of the load distribution in the plane (x1,x2) that have value in the plane (R,I) falling within the sector S1 are associated with electrode 1, those falling within sector S2 are associated to electrode 2 and so on.

For instance, each point P1 in the plane (R,I) will have a real component R1 and an imaginary component I1 that are located in planes $(x_1,x_2)$ of FIGS. 3(b) and 3(c) respectively. For each point P1, therefore there are two points in the space, that is two pairs of values $(x_1,x_2)$, associated to the electrode 1. It is also possible, such as shown in FIG. 4(b), to define a further transition sector S0, such that the points falling in S0 are not associated to any electrode and thus it is possible to avoid points of contact between the electrodes.

FIG. 5 shows, with grey shades, the shape of the four electrodes 1-4 obtained by the method described above.

Still with reference to FIG. 5, four different incoming directions of impulse waves, denoted by arrows D1, D2, D3 and D4 are shown. D1 and D2 are different from D3 and D4 only for the orientation.

Figure 6:
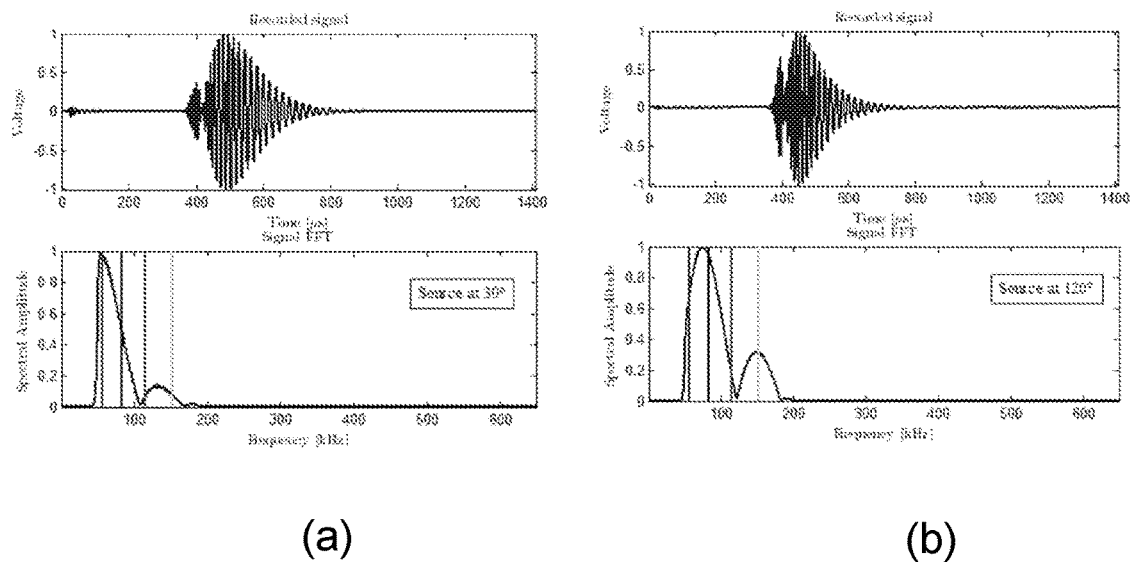
FIGS. 6a and 6b show the time response and frequency response of the sensor/actuator of FIG. 5 to an impulse wave coming from directions D1 and D2 denoted in FIG. 5 respectively.
Figure 7:
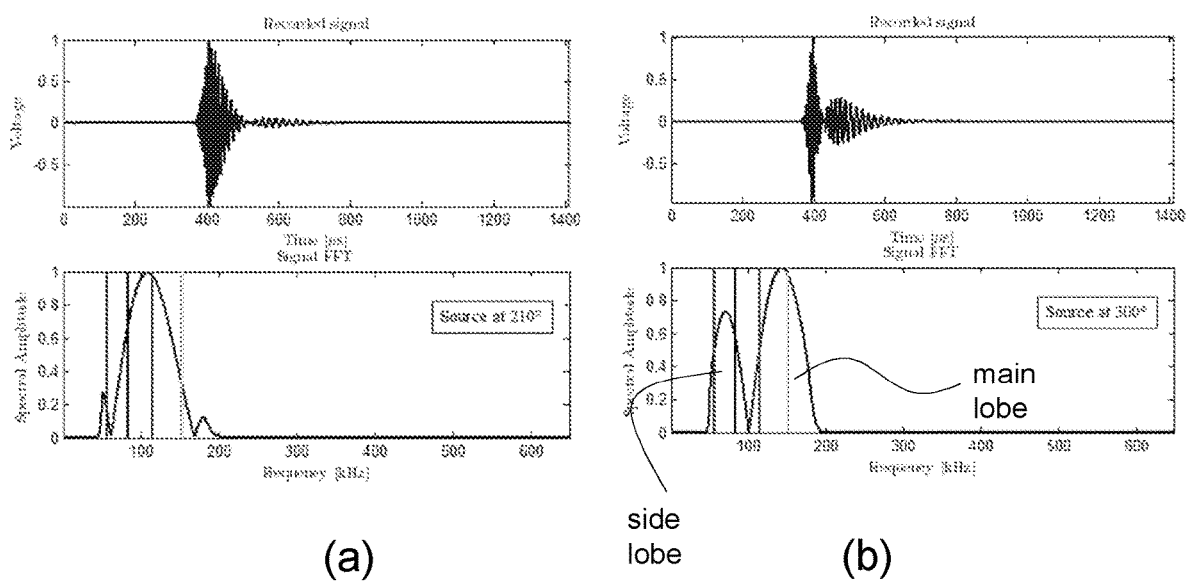
FIGS. 7a and 7b show the time response and frequency response of the sensor/actuator of FIG. 5 to an impulse wave coming from directions D3 and D4 denoted in FIG. 5 respectively.

FIGS. 6 and 7 show the graphs of the spectrum of the signal received from impulse waves coming from direction D1 and direction D2 respectively for FIGS. 6(a) and (b); for FIGS. 7 (a) and (b) from direction D3 and direction D4; in such figures it is possible to note that the frequency at which the response of the sensor/actuator has a peak is a function of the angle of incidence: for the wave D1 (FIG. 6(a)) the signal coming from the device has a frequency peak centered on 57 kHz, for wave D2 (FIG. 6(b)) the output signal has a frequency peak centered on 84 kHz, for wave D3 (FIG. 7(a)) the output signal has a frequency peak centered on 115 kHz and finally for the wave D4 (FIG. 7(b)) the output signal has a frequency peak centered on 150 kHz.

As seen by comparing FIGS. 6 and 7, the device 10 according to the present invention is therefore able to determine both the direction of propagation of the guided waves and their orientation by the particular asymmetric directivity function.

Figure 8:
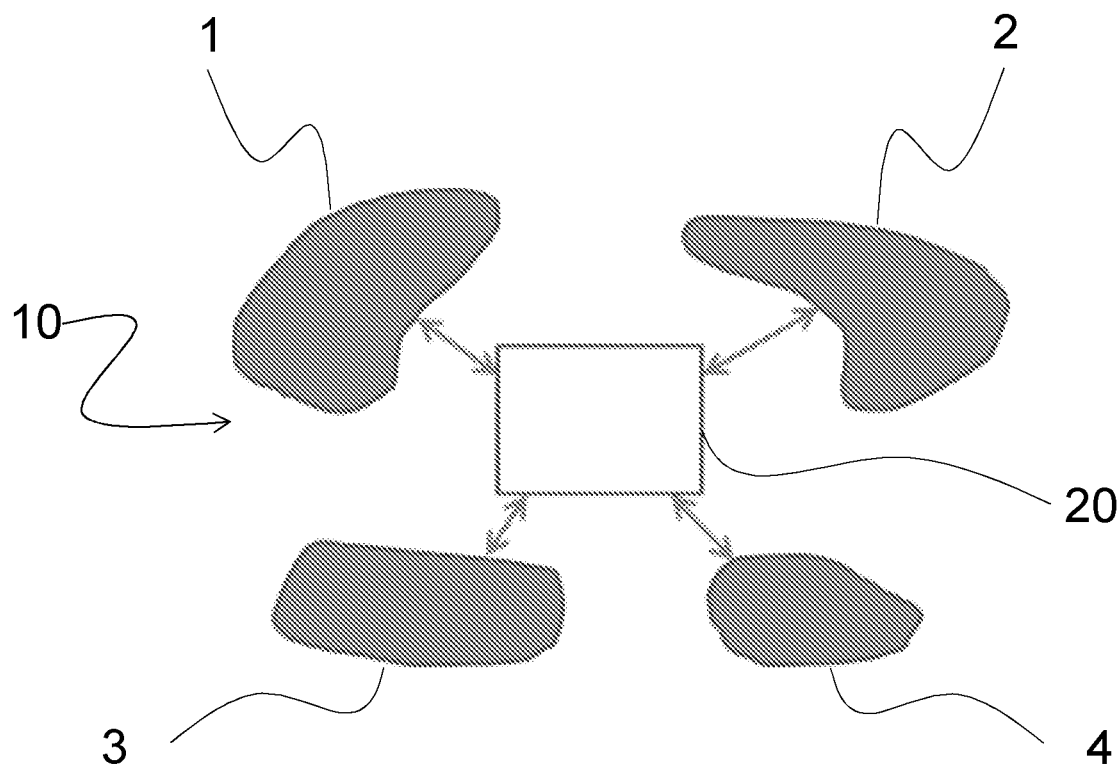
FIG. 8 schematically shows a sensor/actuator according to the present invention, in one embodiment providing four electrodes.

Obviously the electrode distribution described and obtained above requires appropriate electronic circuitry, to determine the direction and orientation of origin of a guided wave and to generate a guided wave with a desired direction and orientation. FIG. 8 schematically shows a device (sensor/actuator) 10 with four electrodes 1, 2, 3 and 4 made of piezoelectric material connected to the electronic circuitry 20 to operate and control the device. Such electronic circuitry 20 consists in one or more electric connections to an assembly of passive components for impedance matching which interface the electrodes 1, 2, 3 and 4 with a device based on integrated circuits for operating the electrical signals necessary to transmit the ultrasound waves and to record the electrical signals generated by ultrasound waves incident on electrodes 1, 2, 3 and 4.

By the geometrical shape of its electrodes 1, 2, 3 and 4, the device 10 is thus able to perform a frequency control of the direction and orientation of reception/transmission of guided elastic waves; more precisely, the device 10 is able, in reception, to provide a frequency response variable as a function of the direction of the incident elastic wave and, in transmission, to emit elastic waves in different directions depending on the frequency of the excited signal at said electrodes 1, 2, 3 and 4 thereof.

Thus, by performing a frequency filtering, it is possible to isolate the waves coming from a specific direction and having a specific orientation with respect to all the others. The fact of knowing the direction and orientation of propagation of the waves, as well as the position of sensors/actuators on the structure to be controlled, are key elements for supplying triangulation algorithms intended to locate the position of possible defects; it is well known that defects dynamically stressed, for instance because being hit by guided waves, reflect a part of the incident energy becoming themselves acoustic sources.

Preferably said sensor/actuator 10 is produced by cutting a piezoelectric material according to the desired geometrical shape with metalizing for instance Lead zirconate titanate (PZT) or Polyvinylidene fluoride (PVDF), or by shaping according to the desired geometrical shape only the metalizing of said piezoelectric material to make the electrodes. Then the sensor is secured to the structure to be controlled by a removable adhesive.

Figure 9:
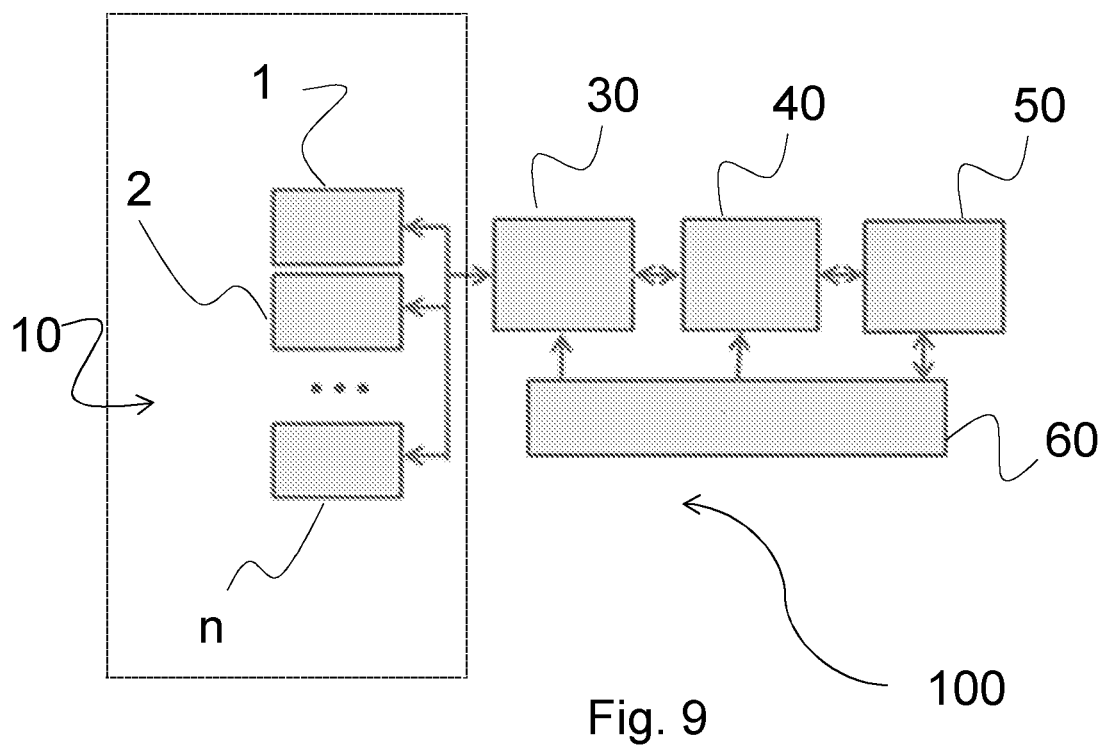
FIG. 9 is a block diagram of a sensor node according to the present invention comprising a plurality of sensors/actuators of FIG. 8.

Now with reference to FIG. 9 the device 10 described above is integrated within a sensor node 100 that can be used for monitoring the structural integrity of a structure.

The sensor node 100 therefore comprises a device 10 of the type described above (therefore comprising a plurality of piezoelectric electrodes—1, 2, 3, 4 . . . , n—suitably dimensioned and designed to obtain the frequency-controlled directivity).

A transmitting and receiving unit 30 acts as an interface between the device 10 and the control unit 40, allowing electric pulses present at electrodes 1-n to be transferred when stressed by a guided wave within the structure and vice versa suitable control electrical signals to be transferred when the control unit 40 desires to generate a guided wave in a specific direction and with a specific orientation in the structure.

Advantageously, but not necessarily, the sensor node 100 comprises also a communication interface 50 that allows the sensor node to communicate with the other sensor nodes. In one variant the communication means 50 can comprise communication means by optical fiber, to allow a very lightweight wiring of the system wherein the sensor node is inserted.

A power supply 60 supplies the control unit 40, the communication means 50 and if necessary also the transmitting and receiving unit 30; such transmitting and receiving unit can be active or passive.

The control unit 40, for instance a microcontroller, is configured for:
a) processing the signals deriving from the 1-n electrodes of the device 10 such to determine direction and orientation of origin of the guided wave that has stressed them,
b) generating electrical signals to be applied to each of the electrodes of the device 10. Entering in details, each sector is associated to a phase angle as a function of the position of the sector on the plane (R, I) for example, with reference to the sectors of FIG. 4, 0° for S1, 90° for S2, 180° for S3 and 270° for S4 then:
   i) When the transducer is used as the receiver the signals acquired on the different electrodes are phase-shifted by an amount equal to the phase angles associated to the acquisition electrodes and therefore summed together. Then the frequency spectrum of the sum signal is calculated and the pulsation $\omega_{MAX}$ is extracted that is the position of the maximum peak of the spectrum. On the basis of the relations (3) and (4) finally $\omega_{MAX}$ is associated to a direction of propagation.

ii) When the transducer is used in generating mode the direction of propagation for the wave to be operated is selected and the relations (3) and (4) are used to determine the main frequency of the signal to be operated. Then a waveform is selected compatible with the preceding choice, for example ten cycles of sinusoid at the selected frequency. Finally at the electrodes the operating electrical signals are generated which correspond to the waveform phase-shifted according to the relevant phase angles.

Figure 10:
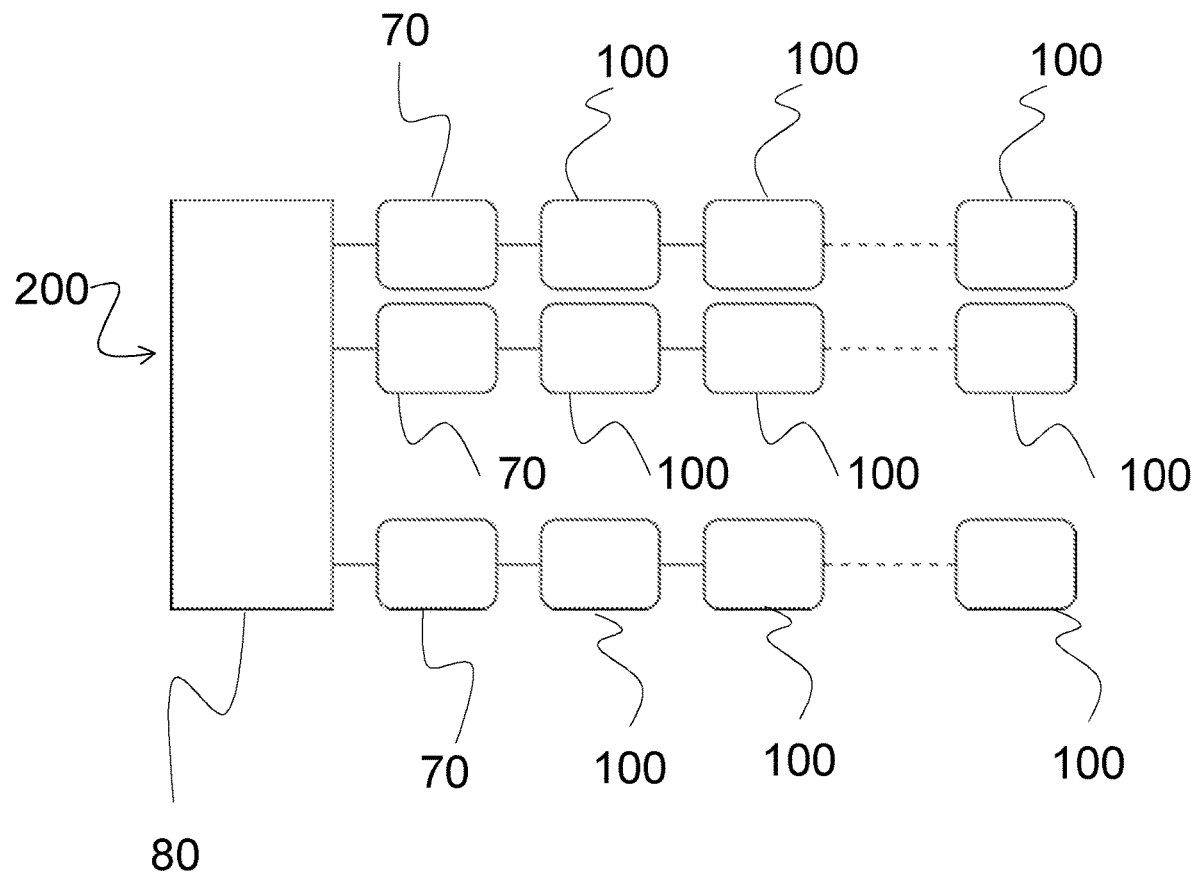
FIG. 10 shows a block diagram of a system for the real-time structural diagnostic by guided elastic waves detected by an array of sensor nodes of FIG. 9.

With reference now to FIG. 10, a system 200 is described for the monitoring and structural diagnostics in real-time by guided elastic waves according to the present invention.

The system 200 comprises a plurality of sensor nodes 100, a plurality of access points 70 and a central processing unit 80.

Preferably each sensor node 100 is of the type shown in FIG. 9 and described above, wherein the piezoelectric device 10 has a variable number from 2 to 4 of shaped electrodes.

Preferably each of said access points 70 is configured for the power-line transmission and reception of data.

Said central processing unit 80 is of known type and traditionally used in applications provided in the present description; preferably said central processing unit 80 is a portable processor connected to said access points 70 and supplying said access points 70.

By means of the experimental tests it has been proven that it is possible to make bidirectional communications with the access points 70 as well as to acquire electrical signals generated by devices 10 of the type described above and contained in the sensor nodes 100 of the system 200.

It is clear for the person skilled in the art that, on the basis of the specific applications, it will be possible to optimize the number, dimensions and arrangement of the electronic components; if necessary it will be also possible to miniaturize the system 200 and its individual components.

Figure 11:
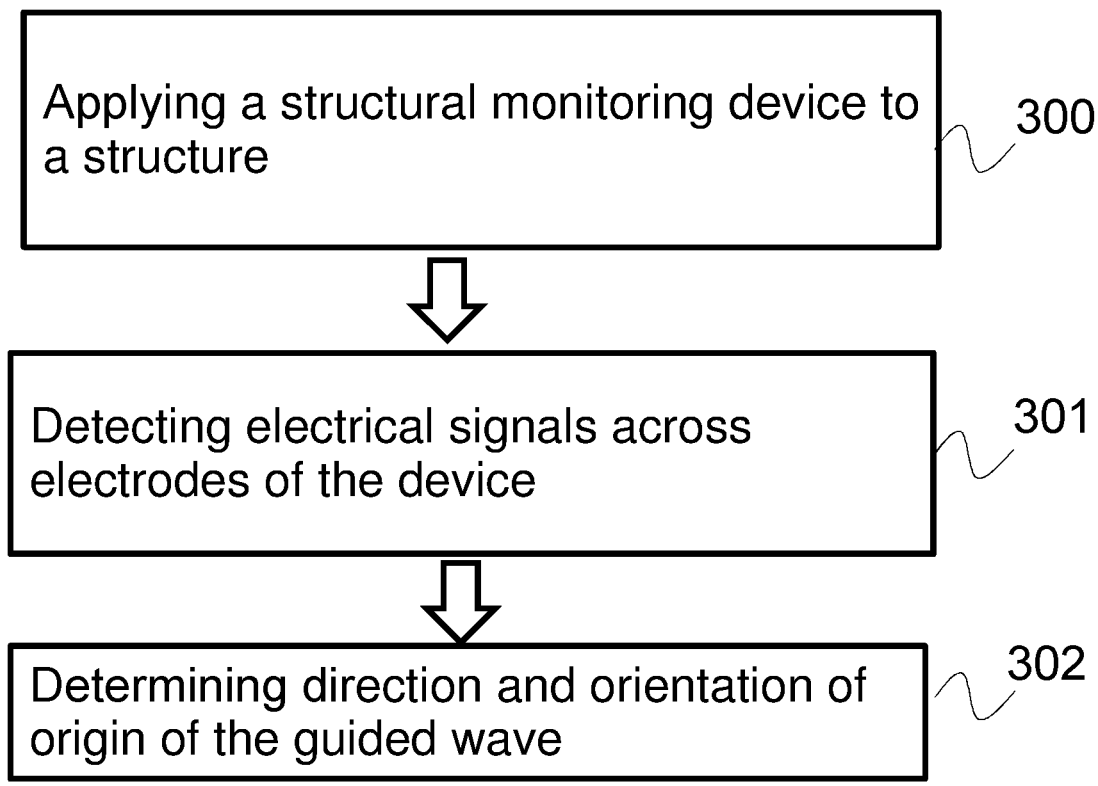
FIG. 11 shows a flow diagram of a method for the real-time structural diagnostic by guided elastic waves detected by a piezoelectric sensor/actuator according to the invention.

In the light of what described above, it is clear that the devices and the systems described above allow a method to be implemented for monitoring the structural integrity of a structure made of metal or composite material (see FIG. 11), comprising the following steps:

i. applying to the structure a device 10 of the type described above (step 300);
ii. detecting the electrical signals generated across the electrodes of the device by a guided wave propagating in the structure (step 301),
iii. determining the direction and orientation of origin of the guided wave (step 302) according to the following steps:
a. summing the signals detected after having operated the phase-shift associated to each electrode
b. computing the spectrum of the sum signal and extracting the peak frequency,
c. inverting the relations (3) and (4) to determine the direction of propagation on the basis of the peak frequency.

Generally for monitoring a structure a plurality of the devices of the type described above is applied to the structure, each one of them detecting or not a wave coming from a given direction and having a given orientation. By triangulating such information it is thus possible to determine with a good accuracy the point of origin of the guided wave that has excited the devices.

Advantageously in order to provide a better monitoring of the structure, it is possible to generate a guided wave in the structure by a device 10 of the type described above, by applying to the device electrodes the electrical signals with the same spectrum of amplitude but with phase spectrums phase-shifted according to the phase angles associated to the individual electrodes. The spectrum of amplitude of the operating signals can be selected such that a frequency is mainly excited, such that accordingly the generated wave propagates mainly along a direction and with a given orientation. Therefore this allows in a system 200 of the type described above to generate a guided wave in the structure by a device 10 inserted in one of the sensor nodes 100 and therefore to verify the signals received from the other sensor nodes 100. By repeating such operation, if there are deviations in the signals received from the same sensor node than this is a sign of a damage to the structure.

It will be clear to a person skilled in the art that, on the basis of the specific applications, it will be possible to optimize the manufacturing process for making the geometrical shape of the electrodes 1, 2, 3 4 . . . n, as well as of the device 10 obtained by using them and of the sensor node 100 and of the system 200 incorporating at least one device 10.

Briefly, the main advantages of the piezoelectric device, of the sensor node, of the system and of the method according to the present invention are the fact of:
  improving safety standard of structures equipped with the devices of the invention, by continuously controlling the integrity condition of the structures, with an immediate advantage for the user, while meeting the most severe information safety standard;
  investigating areas hard to be reached or currently not reachable, by the use of sensor nodes comprising the devices of the invention and characterized by small dimensions and simplified wiring;
  reducing inspection time for searching for scarcely visible structural damages, by the ability of the devices of the invention to indicate the position of possible impacts occurred;
  limiting the costs related to out of service due to maintenance and avoiding not necessary maintenances, by the possibility of the devices of the invention to discriminate between significant alterations and not significant alterations of the properties of the structures being investigated.

In the light of the above it is clear how the device, the sensor node, the system and the methods described above allow the provided objects to be achieved allowing a structure to be efficaciously monitored.

Several variants can be made to the method for producing a FSAT device, the device itself, and other components and methods described above without for this reason departing from the scope of protection as defined by the annexed claims.

For instance once the load distribution is defined, due to thresholding procedures the frequency response of the sensor is deteriorated, whose real directivity function does not perfectly matches with the one taken as a starting point of the design. In particular the directivity function of the real device will have one or more side lobes (for instance shown in FIG. 7(b)).

In one alternative embodiment, in order to reduce the side lobes a Half-Toning process is applied to the load distribution providing to segment the electrodes associated to the regions dividing the complex plane into several small electric contact elements (pixels).

Such solution allows the simplification of the control electronics to be preserved since the elements associated to the same region are connected in parallel and therefore driven by the same circuit while allowing the directivity D(K1, k2) to be replicated more truly.

Half toning algorithms generally are applied for quantizing grey scale images with a bit per pixel. In particular the approach described in [1], called as "error diffusion" approach (called also as 2d delta-sigma modulation) the image is scanned, the pixel is quantized and the quantization error is subtracted from the adjacent pixels on the basis of the coefficients of a predetermined filter (error filter).

Figure 13:
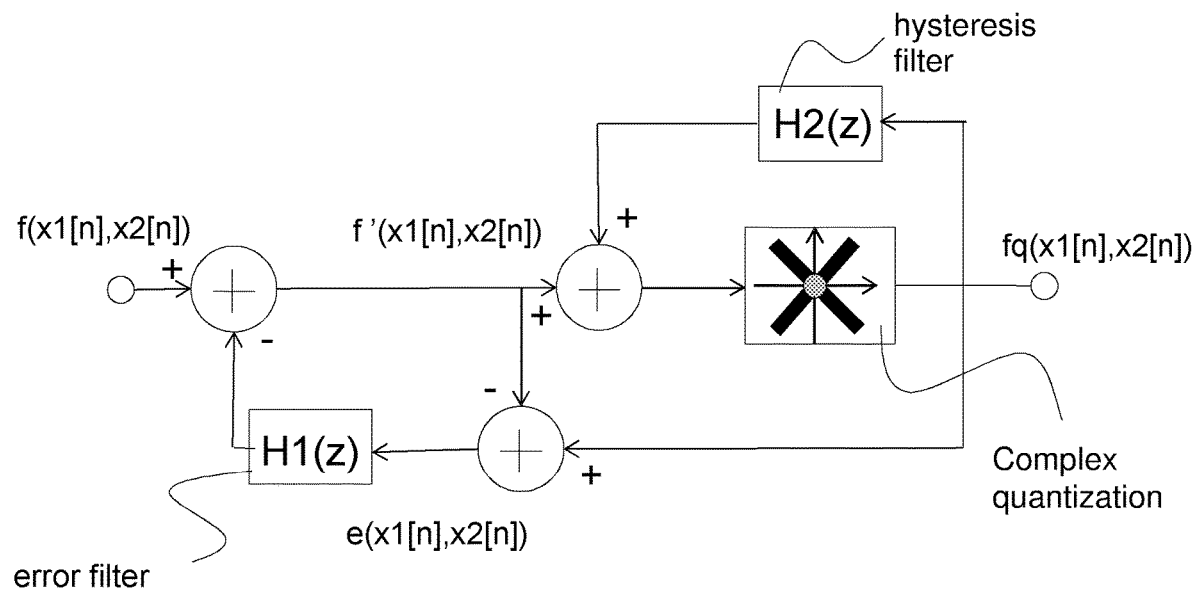
FIG. 13 shows a diagram for the quantization of the load distribution by Half Toning algorithms.

In the case of the quantization of (x1,x2) it is necessary to consider the fact that what has to be quantized is a complex variable and for such reason the traditional half toning error diffusion arrangement has to readjusted according to the diagram of FIG. 13. In particular the diagram comprises the following steps:

a) Pixeling: the spatial domain of the variables x1 and x2 is segmented into "N" small regions corresponding to the possible positioning of the electrical contact elements.

b) The load distribution in the nth pixel f(x1[n],x2[n]) is quantized as a function of the performed division of the plane (R,I) (e.g. that of FIG. 4(b)) and of the phase angle associated to each region (and possibly of the modulus) to determine the value of fq(x1[n],x2[n]).

c) The quantization error on pixel e(x1[n],x2[n]) and (optionally) the quantized distribution fq(x1[n],x2[n]) are brought in feedback and summed to the values of f(x1[n],x2[n]) according to the weights associated to the error filters (H1) and to hysteresis filters (H2). Some possible choices for the hysteresis and error filters are shown in [1].

Figure 14:
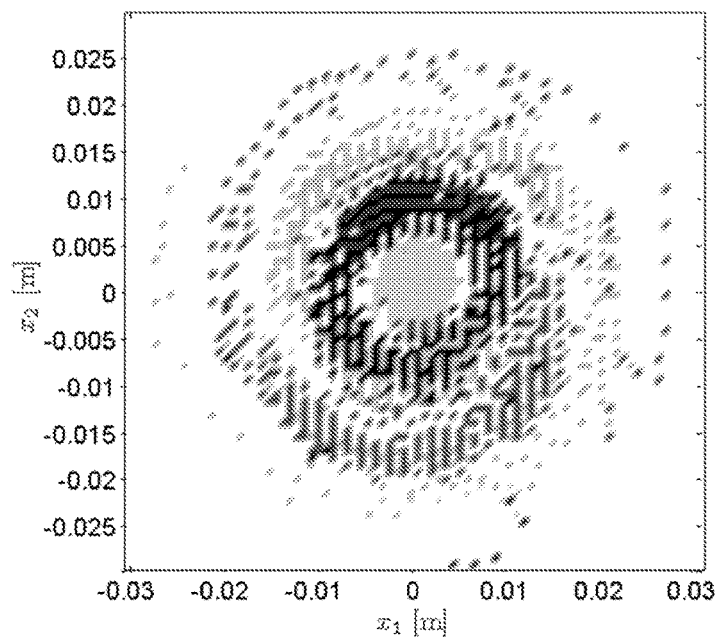
FIG. 14 shows a sensor/actuator obtained by using the quantization outlined in FIG. 13.

An example of determining the shape of the electrodes by half toning algorithms is shown in FIG. 14. In this figure the pixels forming the same electrode are drawn by the same grey level.

Figure 15:
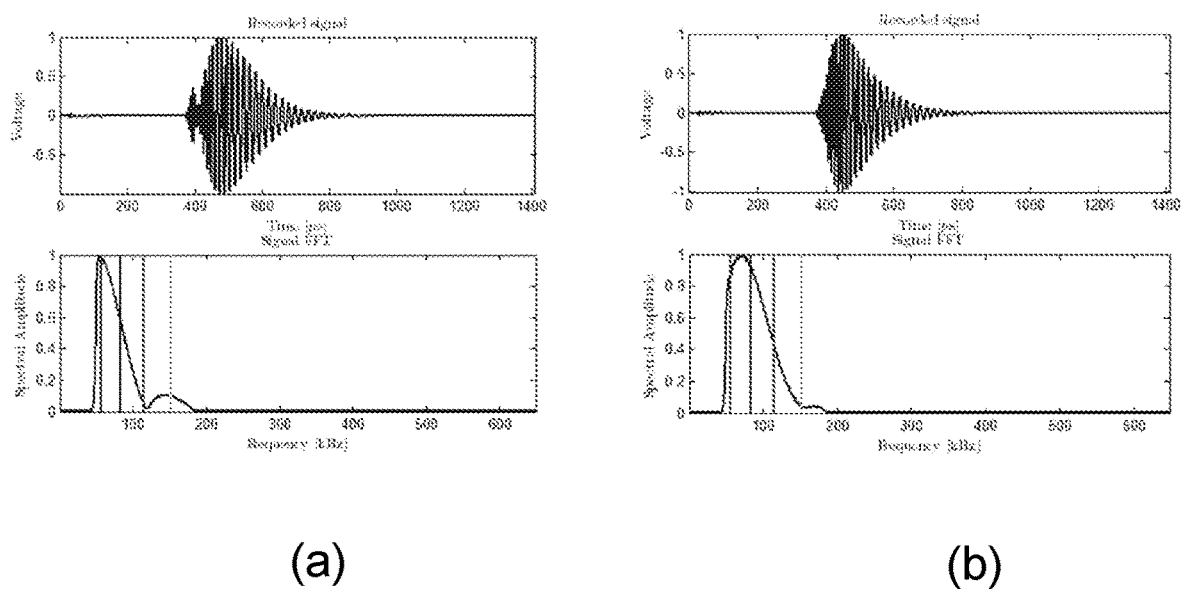
FIGS. 15a and 15b show the time response and frequency response of the sensor/actuator of FIG. 14 to an impulse wave coming from directions D1 and D2 shown in FIG. 5 respectively.
Figure 16:
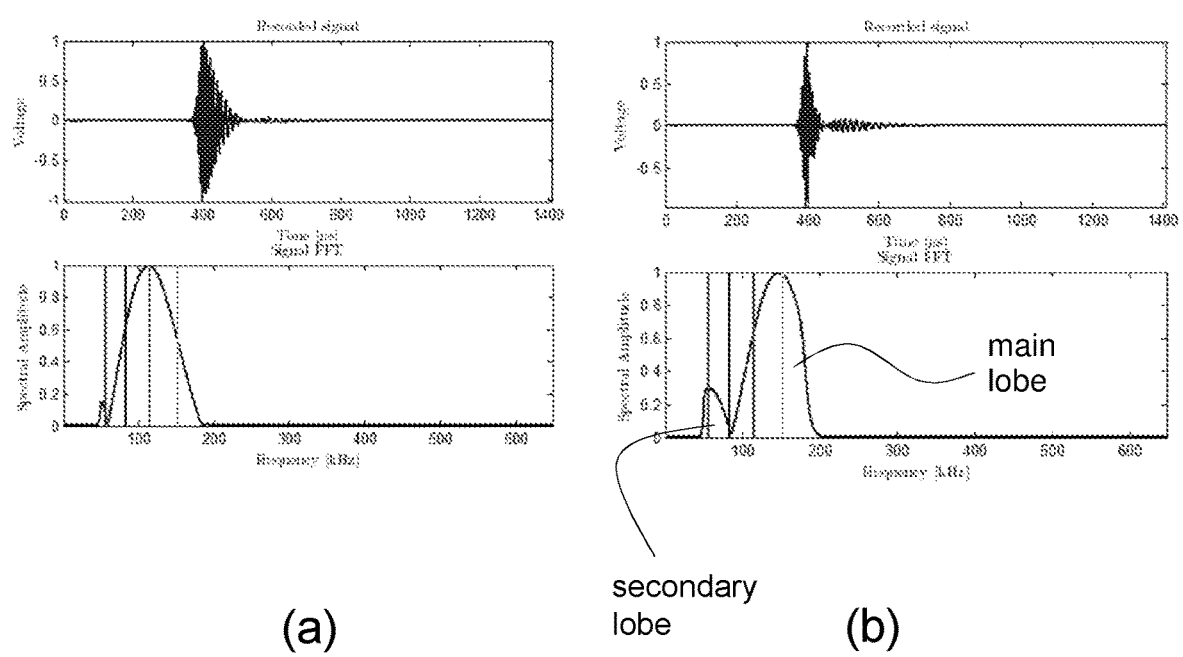
FIGS. 16a and 16b show the time response and frequency response of the sensor/actuator of FIG. 14 to an impulse wave coming from directions D3 and D4 shown in FIG. 5 respectively.

FIGS. 15 and 16 show the charts of the spectrum of the output signal of the sensor (shaped by half toning algorithms) when this is generated by impulse waves coming from direction D1 and direction D2 in FIG. 15(1) and (b) respectively; for FIGS. 16 (a) and (b), from the direction D3 and direction D4; in such figures (as in FIGS. 6 and 7) it is possible to note that the frequency at which the response of the sensor/actuator has a peak is a function of the angle of incidence. It is also possible to note how the side lobe of FIG. 16(b) is considerably reduced with respect to that in FIG. 7(b).

REFERENCES

[1] v. Kite et al., "Modeling and Quality Assessment of Halftoning by Error Diffusion" IEEE Transactions on Image Processing, 2000

The invention claimed is:

1. A method for making a device for monitoring the structural integrity of a structure, comprising the steps of:

defining (400) a directivity function D(k1,k2) that has, in a domain of wave numbers, a plurality of maxima arranged on different concentric circumferences having a center in the origin of a Cartesian axis set associated to a complex plane, computing (401) a load distribution in spatial coordinates f(x1,x2) by inverse Fourier transformation of the directivity function D(k1,k2) defined in the domain of wave numbers, providing (402-404) said device with a plurality of piezoelectric electrodes, a processor for monitoring the structural integrity of a structure and electronic circuitry, said electronic circuitry being adapted to generate an elastic guided wave with predetermined direction and orientation, wherein said electronic circuitry (20) is adapted to select frequencies as a function of the predetermined direction and orientation, applying electrical signals to said piezoelectric electrodes having the selected frequencies and a phase-shift according to a law that depends on a number of sectors in which a complex plane (R,I) is divided;

providing a transmitting and receiving unit (30) for electrical pulses to said device, a control unit (40), having a communication interface (50) connected to sensor nodes and a power supply (60);

characterized in that:

the directivity function D(k1,k2) is asymmetrical, the piezoelectric electrodes (1, 2, 3 ... n) of the device are made according to the following steps:

gathering (402) the values of the load distribution f(x1,x2) in said complex plane (R,I), defining (403) at least two sectors of said complex plane that comprise at least one real value and one imaginary value, making said plurality of piezoelectric electrodes equal in number to the number of said at least two defined sectors, wherein each piezoelectric electrode of said plurality of piezoelectric electrodes has a shape corresponding to the points of the load distribution f(x1,x2) that lie in the same sector (404).

2. The method according to claim 1, wherein the directivity function follows the course of a sector of a spiral of 360°.

3. The method according to claim 1, wherein the geometry of the piezoelectric electrodes is derived from the composition of several elements (pixels) whose arrangement is derived by applying Half Toning algorithms to quantize the load distribution f(x1,x2).

4. A device (10) for monitoring the structural integrity of a structure, the device comprising a plurality of piezoelectric electrodes equal in number to number of sectors of a complex plane and wherein each piezoelectric electrode of said plurality has a shape corresponding to the points of a load distribution f(x1, x2) that lie in the same corresponding sector (404), wherein the load distribution is computed in spatial coordinates by inverse Fourier transformation of a directivity function defined in a domain of wave numbers and has, in the domain of wave numbers, a plurality of maxima arranged on different concentric circumferences having a center in the origin of a Cartesian axis set associated to said complex plane, an electronic circuit (20) adapted to process electrical signals received by said piezoelectric electrodes by operating a phase-shift of the received electrical signals according to a law that depends on the number of sectors in which the complex plane (R,I) is divided, determining a direction and an orientation of origin of an elastic guided wave in the plane by summing the phase-shifted electrical signals and obtaining the position of the peak of the spectrum of the signal obtained by summing the phase-shifted signals.

5. The device (10) according to claim 4, wherein said plurality of piezoelectric electrodes and said electronic circuitry (20) being adapted to generate an elastic guided wave with predetermined direction and orientation, wherein said electronic circuitry (20) is adapted to select the frequency contents as a function of the predetermined direction and orientation, and to apply to the electrodes electrical signals having the selected frequency contents and phase-shifted according to a law that depends on the number of sectors in which the complex plane (R,I) is divided.

6. The device (10) according to claim 4 comprising at least a sensor node (100); a transmitting and receiving unit (30) for electrical pulses to said at least one device (10); a control unit (40); a communication interface (50) with other sensor nodes and a power supply (60).

7. The device according to claim 6, further comprising means for receiving and/or transmitting data from/on optical fiber.

8. The device according to claim 6 comprising a plurality of sensor nodes (100), a plurality of access points (70) and a central processing unit (80).

9. A method for monitoring the structural integrity of a structure, comprising the following steps:
   i. applying to a structure a device comprising
       a plurality of piezoelectric electrodes equal in number to number of sectors of a complex plane and wherein each piezoelectric electrode of said plurality has a shape corresponding to the points of a load distribution f(x1,x2) that lie in the same corresponding sector (404), wherein the load distribution is computed in spatial coordinates by inverse Fourier transformation of a directivity function defined in a domain of wave numbers and has, in the domain of wave numbers, a plurality of maxima arranged on different concentric circumferences having a center in the origin of a Cartesian axis set associated to said complex plane,
       an electronic circuit (20) adapted to process electrical signals received by said piezoelectric electrodes by operating a phase-shift of the received electrical signals according to a law that depends on the number of sectors in which the complex plane (R,I) is divided, determining a direction and an orientation of origin of an elastic guided wave in the plane by summing the phase-shifted electrical signals and obtaining the position of the peak of the spectrum of the signal obtained by summing the phase-shifted signals;
   ii. detecting the electrical signals received by said piezoelectric electrodes of the device by a guided wave in the structure (301),
   iii. determining the direction and orientation of origin of a guided wave (302) according to the following steps:
       a. making a frequency transformation of the electrical signals detected at the different piezoelectric electrodes,
       b. adding phase-shifts, associated to the piezoelectric electrodes, to the phase curves of the electrical signals detected at the different piezoelectric electrodes,
       c. calculating a sum signal by summing the signals obtained in step b, and
       d. determining the peak of the amplitude spectrum of the sum signal and from its position determining the direction of propagation on the basis of the directivity of a sensor.

10. The method according to claim 9, wherein the elastic guided wave is generated by said device, and a plurality of phase-shifted signals are applied to said piezoelectric electrodes with an equal amplitude spectrum.

11. The method according to claim 9 and wherein the signals are phase-shifted by the phase angle associated to the piezoelectric electrodes as a function of the mutual position of the sectors of the complex plane (R,I).

12. The method according to claim 9, wherein the phase-shifted signals have a spectrum whose frequency contents determines the direction of propagation and orientation of the operated wave on the basis of the directivity D(k1,k2).

* * * * *